Sept. 16, 1930.   V. E. READY   1,776,086
OUTBOARD BEARING
Filed Aug. 24, 1927

INVENTOR.
Virgil E. Ready
BY Bradbury & Caswell
ATTORNEYS.

Patented Sept. 16, 1930

1,776,086

UNITED STATES PATENT OFFICE

VIRGIL E. READY, OF PASADENA, CALIFORNIA, ASSIGNOR TO NEILAN, SCHUMACHER & CO., OF LOS ANGELES, CALIFORNIA, A CORPORATION OF CALIFORNIA

OUTBOARD BEARING

Application filed August 24, 1927. Serial No. 215,093.

My invention relates to an improved outboard bearing, the primary object being to provide a self contained shaft, bearing and support which is simple and effective in construction and which can easily and quickly be detachably applied to the side or other wall of a housing or other frame work for transmitting motion from a driving to a driven element without dis-assembling any of its parts. A device of this nature is applicable for use in connection with floats, valves, governors and various other instrumentalities wherein motion is transmitted from one location to another. The primary object is to provide a structure which will be entirely free from binding and friction effect of the shaft in its bearings. The invention also provides means for producing a fluid tight joint around the shaft in the self contained structure without effectively retarding the action of the shaft. With these and other objects in view my invention comprises the features of construction and combination of parts hereinafter described and claimed.

Figure 1:
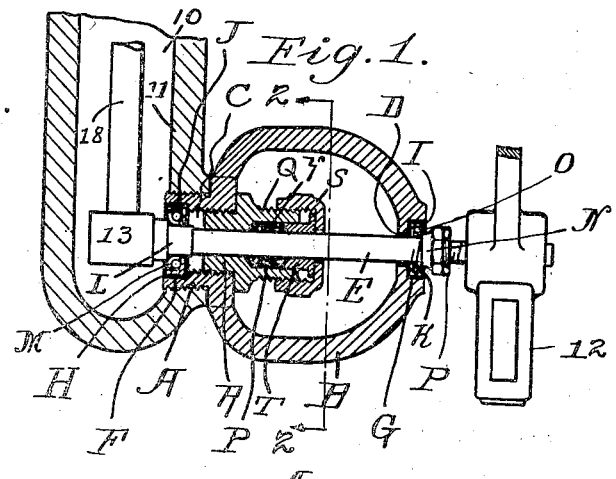
Figure 2:
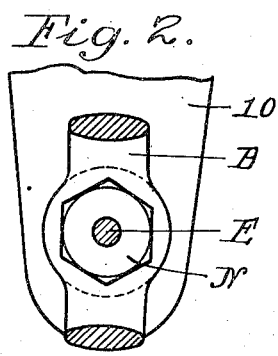
Figure 3:
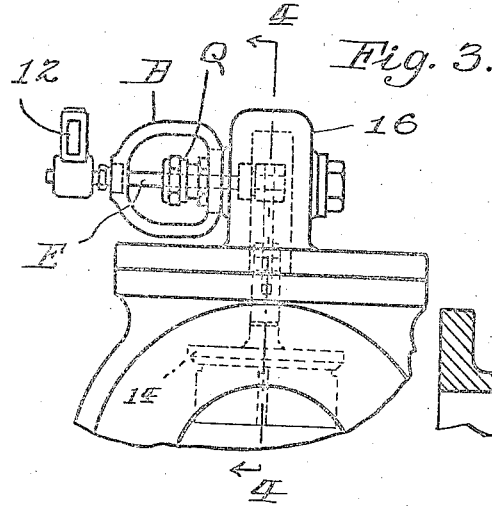
Figure 4:
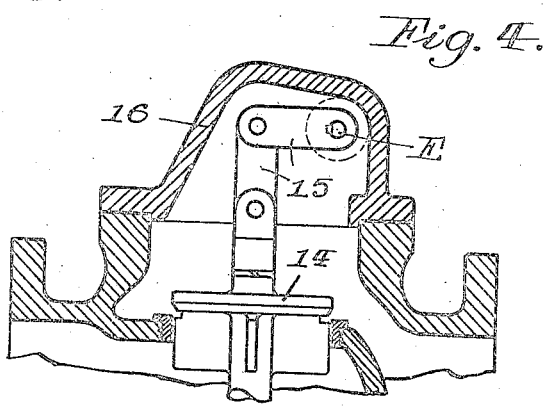

In the accompanying drawing forming part of this specification, Fig. 1 is a longitudinal section through a portion of a float chamber and my improved outboard bearing applied thereto; Fig. 2 is an enlarged section of a detail taken on line 2—2 of Fig. 1; Fig. 3 is a side elevation of my invention shown applied to a valve housing for use in actuating a valve therein, and Fig. 4 is a section taken on the line 4—4 of Fig. 3.

In the drawing A indicates a supporting stud having a comparatively large yoke B on one end. Extending longitudinally through said stud and the portion of said yoke opposite said stud are passages C and D, through which a shaft E extends freely. Suitable recesses F and G in the extremities of the stud and yoke receive and securely hold the ball retaining cup members H and I of ball bearings J and K. A shoulder L formed on one end of shaft E coacts with the race of ball bearing M in the cup member J to assist in producing a thrust bearing for the shaft on one end and a nut N threaded on shaft E coacts with the bearing balls O in cup member G to produce the thrust bearing for the shaft on or near its opposite end. The lock nut P serves to hold the nut N adjusted. A stuffing box Q is placed over the shaft E to produce a fluid tight joint around the shaft E. One member R of said stuffing box is threaded tightly into the passage C of the stud member A and the packing compression member S is threaded over member R to drive the gland T into the chamber P and compress the packing V around the shaft.

The structure described is self contained, that is its parts constitute a unit which can as a whole be applied to any device desired to provide a combination inside and outside thrust and journal bearing, for a shaft and its driving and driven connections.

As shown in Fig. 1, the device is applied to a float chamber 10, the stud A being threaded tightly into the wall 11 thereof with one end of the shaft E projecting into said chamber and the opposite end carrying an actuating lever arm 12 for operating valve mechanism (not shown) or any other means desired. The inner end of said shaft is shown formed with a head 13 in which a float arm 18 is secured to cause the rocking movement of said shaft by the rise and fall of liquid in said chamber. In applying the outboard bearing to the float chamber or any other device it is only necessary to screw the stud A into the support. The even distribution of the load on the bearings prevents any binding effect and therefore the shaft will turn freely at all times. Another application of the outboard bearing is shown in Fig. 3 in which a valve 14 is opened and closed through the turning movement of the shaft or vice versa the shaft is turned by the opening and closing movement of the valve. In this structure the connections between the valve and shaft E are by means of toggle levers 15 and the stud A of my invention is threaded into the housing 16 of the valve chamber. The outboard bearing is also applicable for use in various other places where motion is to be transmitted without binding effect of the shaft and without leaking around the shaft. It is extremely simple in construction and easily applied for use.

The yoke by reason of its loop shape produces a stronger and more rigid structure than heretofore and enables one to adjust the stuffing box more easily.

In accordance with the patent statutes, I have described the principles of my invention together with the construction which I now consider to represent the best embodiment thereof but I desire to have it understood that the construction is only illustrative and that the invention can be carried out by other means and applied to uses other than those above set forth within the scope of the following claims.

Having described my invention what I claim as new and desire to secure by Letters Patent is:

1. An outboard bearing, comprising, in combination, a stud having an outstanding yoke member, said stud being adapted to be detachably secured in a support with said yoke member extending outwardly therefrom, a shaft extending across and through the side of said yoke member and through the stud, bearings seated in said stud and the outer portion of said yoke and in which said shaft is journaled, a stuffing box between the outer portion of said stud and shaft, and means for holding said shaft in said bearings against end thrust, said parts constituting a unitary structure, for the purposes specified.

2. An outboard bearing, comprising, in combination, a yoke formed with a stud radiating outwardly and adapted for attachment to a support, a shaft extending through and across said yoke and through said stud, ball retaining recesses in the outer end of said stud and in the opposite portion of said yoke and through which said shaft extends, ball bearings seated in said recesses for journaling said shaft and adapted to hold said shaft against end thrust, and a stuffing box placed over the shaft adjacent to said stud to produce a tight joint, said parts being self contained in said yoke whereby the assembled elements as a unit without disturbing them can be adjusted to or removed from said support.

In testimony whereof, I have signed my name to this specification.

VIRGIL E. READY.